United States Patent [19]

Breed

[11] Patent Number: 4,715,617
[45] Date of Patent: Dec. 29, 1987

[54] PASSENGER COMPARTMENT SENSOR WITH LOW BIAS

[75] Inventor: David Breed, Boonton Township, Morris County, N.J.

[73] Assignee: Breed Corporation

[21] Appl. No.: 48,515

[22] Filed: Apr. 24, 1987

Related U.S. Application Data

[63] Continuation of Ser. No. 580,338, Feb. 15, 1984, abandoned.

[51] Int. Cl.⁴ .............................................. B60R 21/08
[52] U.S. Cl. ...................................... 280/731; 280/734
[58] Field of Search ...................... 280/728, 731, 734; 180/282

[56] References Cited

U.S. PATENT DOCUMENTS

| | | | |
|---|---|---|---|
| 4,161,228 | 7/1979 | Svensson et al. | 280/734 |
| 4,167,276 | 9/1979 | Bell et al. | 280/731 |
| 4,204,703 | 5/1980 | Okada | 280/734 |

Primary Examiner—John J. Love
Assistant Examiner—Ross Weaver
Attorney, Agent, or Firm—Kane, Dalsimer, Kane, Sullivan & Kurucz

[57] ABSTRACT

A passenger compartment mounted sensor possesses a low bias and is responsive to velocity change which requires the acceleration to be sustained above the bias level for an extended prior of time.

16 Claims, 10 Drawing Figures

PASSENGER COMPARTMENT SENSOR WITH LOW BIAS

This is a continuation of U.S. patent application Ser. No. 580,338 filed Feb. 15, 1984 now abandoned.

BACKGROUND OF THE INVENTION

It has been found that in a 30 mph frontal barrier crash a restraining device such as an air bag must begin restraining the driver by the time the driver has moved forward about 5 inches if it is to prevent injury. Air bag inflating mechanisms require a period of time, such as 30 milliseconds, to effect inflation of the air bag once a signal initiating inflation has been received from a sensor.

It has also been determined that a passenger protective device is needed in accidents in which movement of the vehicle occupant relative to the vehicle reaches a velocity of about 12 mph or greater. Thus, a sensor is required which will determine that the occupant will collide with some portion of the vehicle's interior at a speed of 12 mph or greater and for a 30 mph frontal barrier or equivalent crash initiates air bag inflation a pleriod of time such as 30 milliseconds before the occupant has moved forwarded 5 inches.

It is important that the sensor which initiates operation of the air bag inflation means be responsive to the acceleration of the passenger compartment rather than some other part of the vehicle because this location leads to certain advantages compared with other sensor locations. For example, if a front fender or bumper of the vehicle should collide with a pole or the like which breaks upon or shortly after impact, a sensor mounted on the front fender or bumper could experience a velocity change of 12 mph or greater before the pole breaks, whereas the passenger compartment of the vehicle might experience a negligible velocity change. Under these circumstances, inflation of the air bag is not required and if inflation occurs, it might even contribute to a subsequent accident. It is important, therefore, that the sensor or sensors with which a vehicle is equipped be located in such positions and be of such construction as to be predictive that the passenger compartment will undergo a velocity change necessitating passenger protection.

The mechanical crash sensor designs (as distinct from electronic) that have been made in the largest quantities are the spring mass sensors. The term "spring mass" or "undamped spring means" as used herein means those sensors wherein the motion of the sensing mass is controlled only by the acceleration experienced by the sensor, its translational or rotational inertia and a bias force such as would result from a spring, a magnet or a rolamite-type band. The spring mass sensor is known to function adequately for short duration crash pulses. Such pulses are characteristic of head on crashes or standard barrier impacts. When the vehicle on which the sensor is mounted experiences a deceleration pulse greater than the biasing force on the sensing mass, such as would accompany a crash, the sensing mass moves rapidly towards the forward end of the vehicle, and initiates air bag inflation.

As a point of reference, the maximum acceleration due to application of the vehicle brakes may be considered to be about 0.7 g.

Previously proposed systems have included crash sensors mounted outside the crush zone. Heretofore, all such sensors, have had biases above about 7 g. All of these prior art sensors have been, in fact, level detectors rather than velocity change detectors. In the case of a crash in which a vehicle travelling 30 mph impacts an object causing a constant acceleration of slightly less than than 7 g's, such as might be approximated when a vehicle impacts one of the crash cushioning devices now placed around many rigid roadside structures, the occupant would sustain serious or fatal injuries. This is certainly an accident requiring an air bag and yet no prior art mechanical sensor would have fired. mass. Other situations where prior art mechanical sensors can fail are impacts with snow banks, striking flooded areas of roadways or impacting soft earth.

Furthermore, certain of the prior art sensors when located within the passenger compartment fail to distinguish between an actual crash condition requiring an air bag and conditions not requiring an air bag such as car bottoming, travel over a curb, railroad track or pot hole. Prior art sensors located in the passenger compartment which have high g biases are very sensitive to extremely short pulses normally encountered in such conditions and would cause the air bag to inflate unnecessarily.

SUMMARY OF THE INVENTION

A principal object of the present invention is to provide a passenger compartment mounted sensor that will alleviate the problems inherent in and encountered by the earlier proposed and prior art sensors when located outside of the crush zone and, specifically, in the passenger compartment.

Another object is to provide a passenger compartment mounted sensor which possesses a low bias and is responsive to velocity change which requires the acceleration to be sustained above the bias level for an extended period of time.

DETAILED DESCRIPTION

Figure 1:
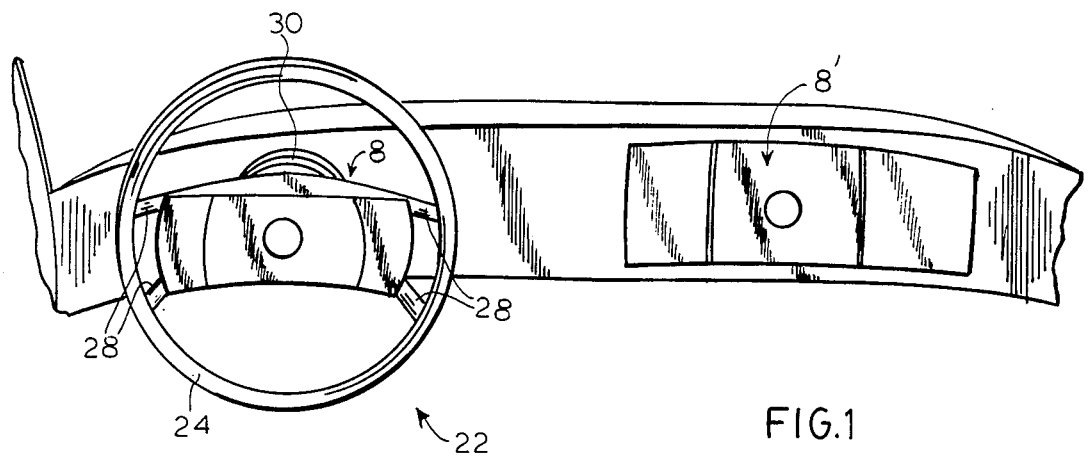
FIG. 1 is a schematic view of a passenger compartment of a vehicle showing air bag systems incorporating sensors of the invention.
Figure 2:
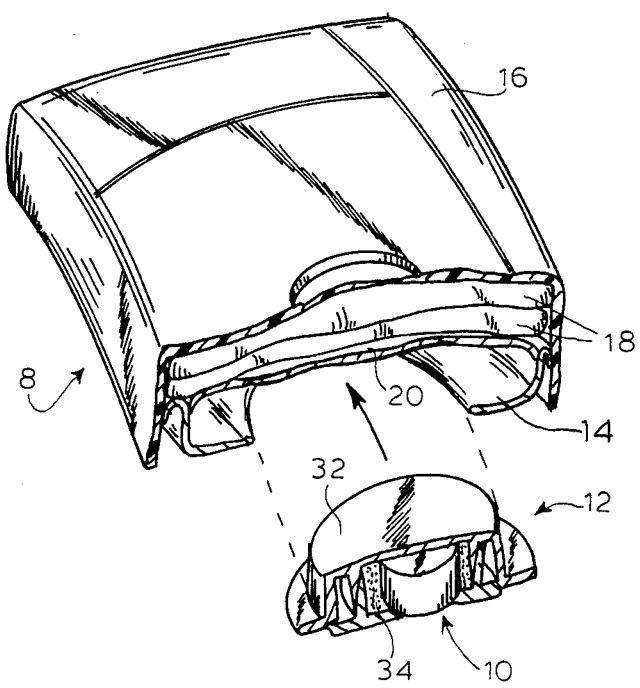
FIG. 2 is an exploded perspective view of the air bag system with certain parts broken away and removed.
Figure 4:
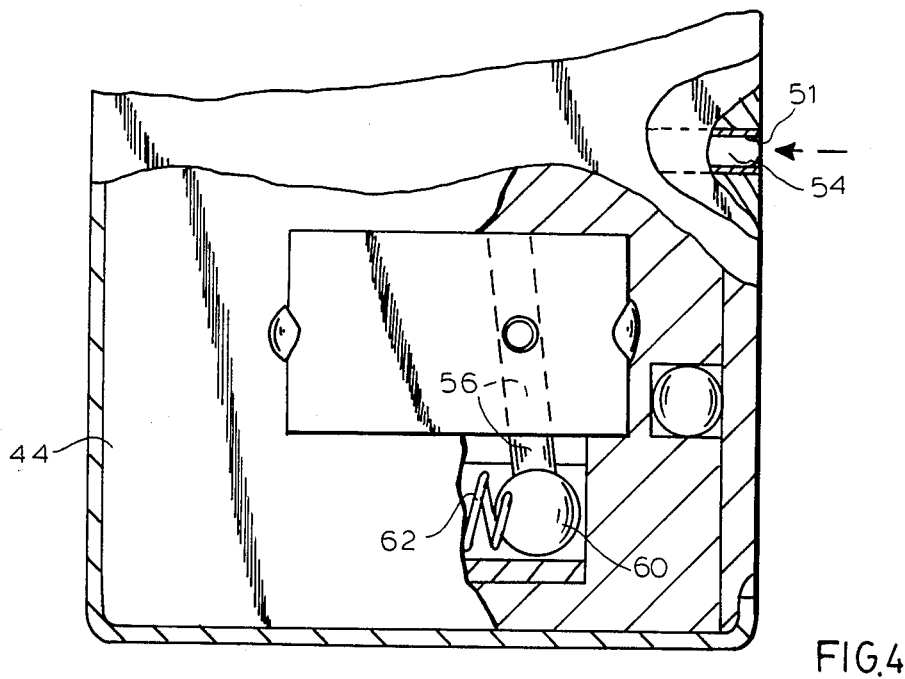
FIG. 4 is an enlarged fragmentary view including the end of the D-shaft and the mounting plate supporting the D-shaft.
Figure 3:
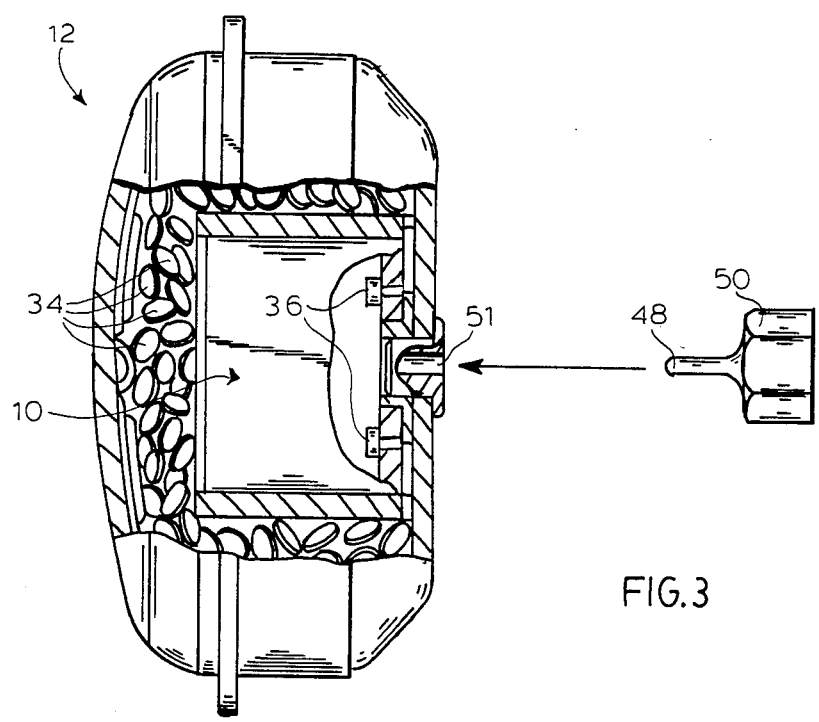
FIG. 3 is a side elevational view of the sensor with the gas generator with certain parts broken away removed and with a pin extending from a steering wheel nut employed for enabling the sensor when wheel mounted.
Figure 5:
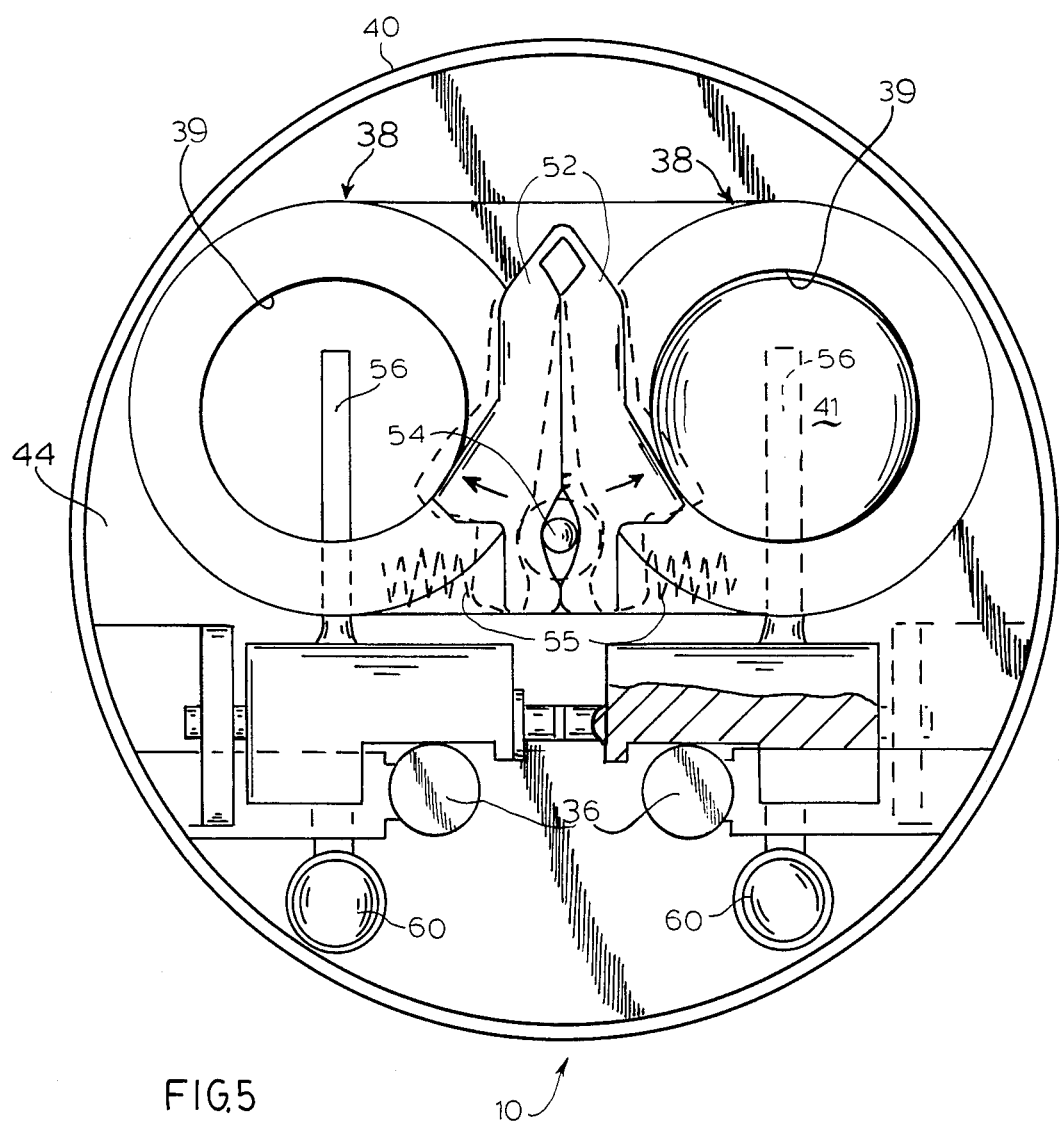
FIG. 5 is a top plan view of the sensor with the cover removed and other parts broken away and removed showing the sensor armed and with dash lines showing the sensor when it is safe.
Figure 6:
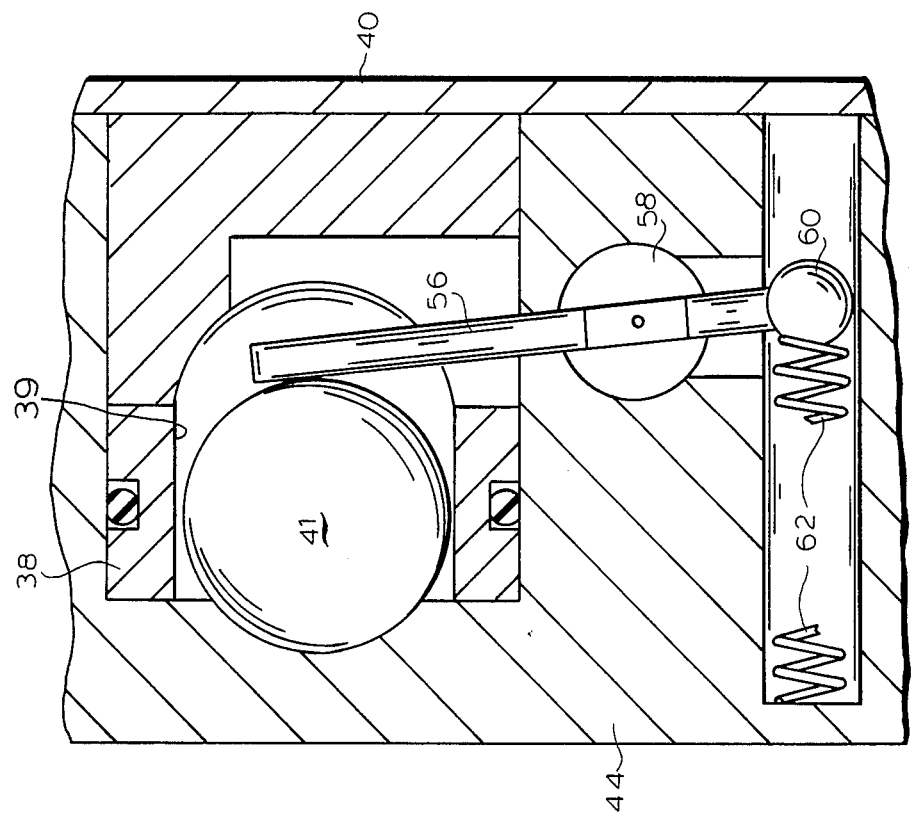
FIG. 6 is an enlarged fragmentary view of the sensor showing the mass and associated pin extending from the D-shaft prior to movement of the mass incident to a crash.

In the drawings, air bag safety restraint systems 8 and 8' incorporating the sensor of the invention are shown mounted within the passenger compartment of a vehicle both at the driver side and the passenger side. This sensor—initiator 10 is preferably mounted inside of the gas generator or inflator 12. However, the sensor—initiator may be otherwise mounted but nevertheless located in the passenger compartment. The inflator 12 is symmetrically mounted on a frame 14 to which is also mounted the housing or cover 16 for the folded air bag 18. Interposed between the inflator and the air bag is a diffuser plate 20 also secured to the frame 14.

The air bag safety restraint system 8 of the present invention is mounted on the vehicle steering wheel 22 through the frame 14. The steering wheel 22 includes an outer rim 24, and a suitable number of radial spokes 28. The air bag safety restraint system 8' is suitably mounted on the passenger side of the compartment and may contain two gas generators and sensor assemblies which may have the same or different crash sensitivities.

The gas generator 12 includes housing 32 containing a gas generating material 34 which may be sodium azide. Sodium azide is stable over a wide temperature range, but when ignited, rapidly decomposes releasing a large volume of nitrogen gas.

Reference is now made to the sensor-initiator 10 shown in detail in FIGS. 4–9. In order to increase reliability, a pair of redundant damped sensors 38 are adapted to actuate respective primers 36 within the housing 40. Each sensor 38 includes a damped sensing mass 41 capable of limited movement within the cylinder 39 in the block 44 contained within the housing 40. Before the air bag safety restraint system 8 is mounted on the steering wheel 22 movement of the sensing mass 41 within the respective cylinder 39 is prevented by means hereinafter described. When the system is mounted on the steering wheel, an extension 48 which is part of the nut 50 which holds the steering wheel onto the steering column enters the lock pin hole 51, in the sensor-initiator 10. This pin extension 48 shifts the conical lock pin 54, permitting the sensing mass lock arms 52 to rotate out of the path of the sensing masses 41, thereby arming the system. The locking arms 52 have a common connection and operate under the bias of springs 55 which urge the arms towards one another. The arms are kept apart and consequently in engagement with the sensing masses 41 to prevent movement of the sensing masses 41, as a result of the conical shape of lock pin 54. When the sensors are rendered safe, the larger diameter part of the conical pin 54 is engaged with the arms 52 to thereby keep them apart and consequently in engagement with the sensing masses 41. When the pin 54 is moved inwardly the smaller diameter of the conical shape of the lock pin 54 is exposed to the arms which when under the influence of the springs 55 are moved towards one another to thereby free the sensing masses 41. As explained previously, the inward movement of the conical pin 54 is caused by the pin 48 of the steering wheel nut 50.

Each sensing mass 41 is associated with a pin 56 extending from a "D-shaft" 58. The other end of each pin 56 includes the spherical ball 60 in engagement with a biasing spring 62 to assure the interengagement of pin 56 with its associated sensing mass 41. Each D-shaft 58 is provided with a face 64 formed in a generally cylindrically shaped exterior surface. In addition a spring biased firing pin 66 is in alignment with the primer 36 and is maintained in a retracted position by the cylindrically shaped portion of the D-shaft 58 and is permitted to be released when aligned with the face 64.

Figure 7:
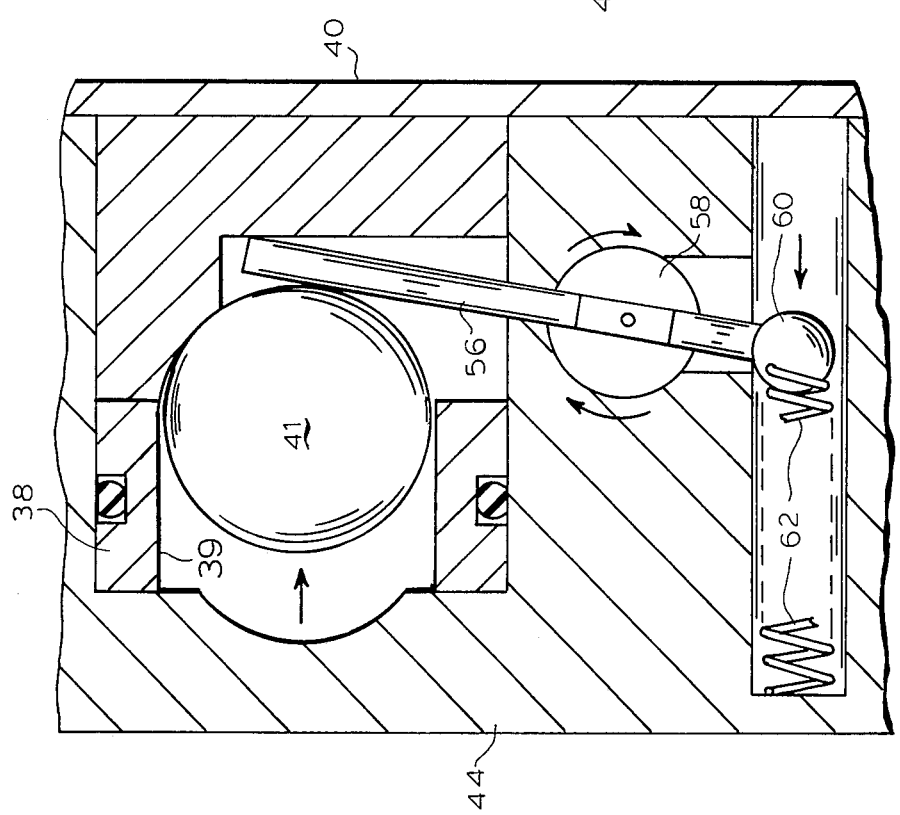
FIG. 7 is a similar view showing the mass shifted as a result of a crash and the movement of the associated pin and the D-shaft.
Figure 8:
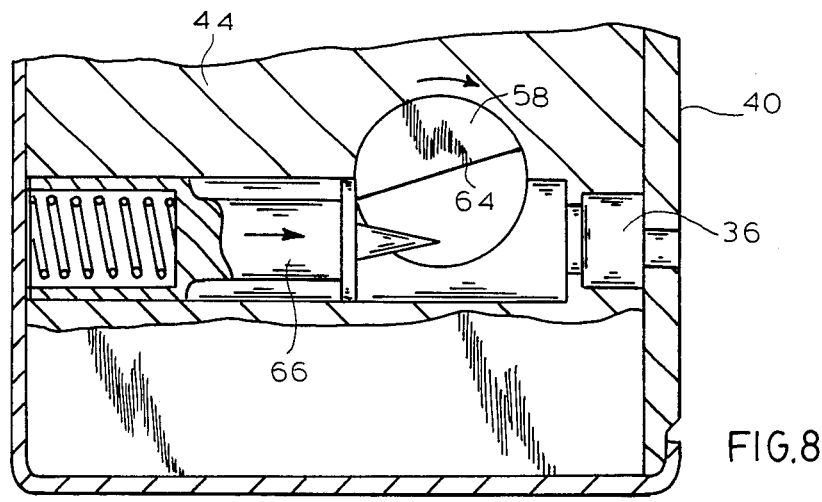
FIG. 8 is an enlarged fragmentary view of the firing pin held in a retracted position by the D-shaft.
Figure 9:
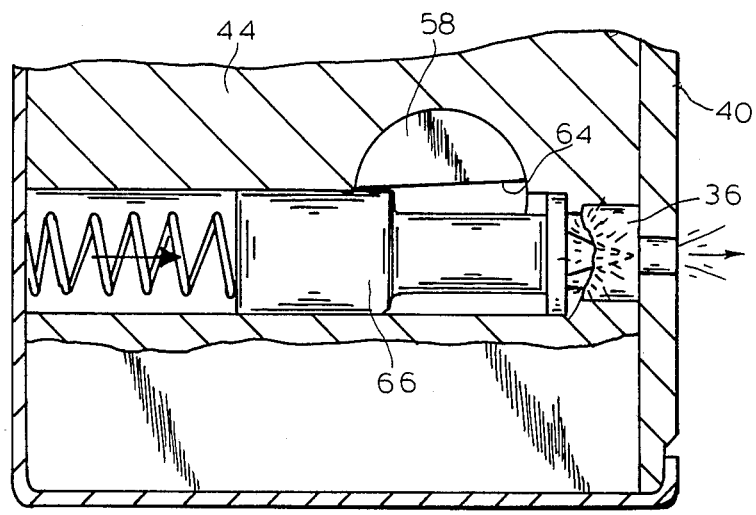
FIG. 9 is a similar view with the firing pin released after a collision is experienced.

In the event that an automobile experiences a crash, each sensing mass 41 moves to the right as shown in FIG. 7. However, this motion is resisted by the bias spring 62 acting through the pin 56 and by the air pressure differential between the left and right sides of the sensing mass 41. This pressure is gradually relieved by virtue of the air flowing in the clearance between the sensing mass 41 and cylinder 39. If the crash is of sufficient severity, the mass 41 will move sufficiently to the right to cause the D-shaft 58 to rotate enough to clear the firing pin 66 and permit it to move past face 64 and impact against primer 36 which then ignites to initiate the ignition of leads 68 which cooperate in initiating the burning of the gas generate material 34, which, in turn, inflates the air bag.

Figure 10:
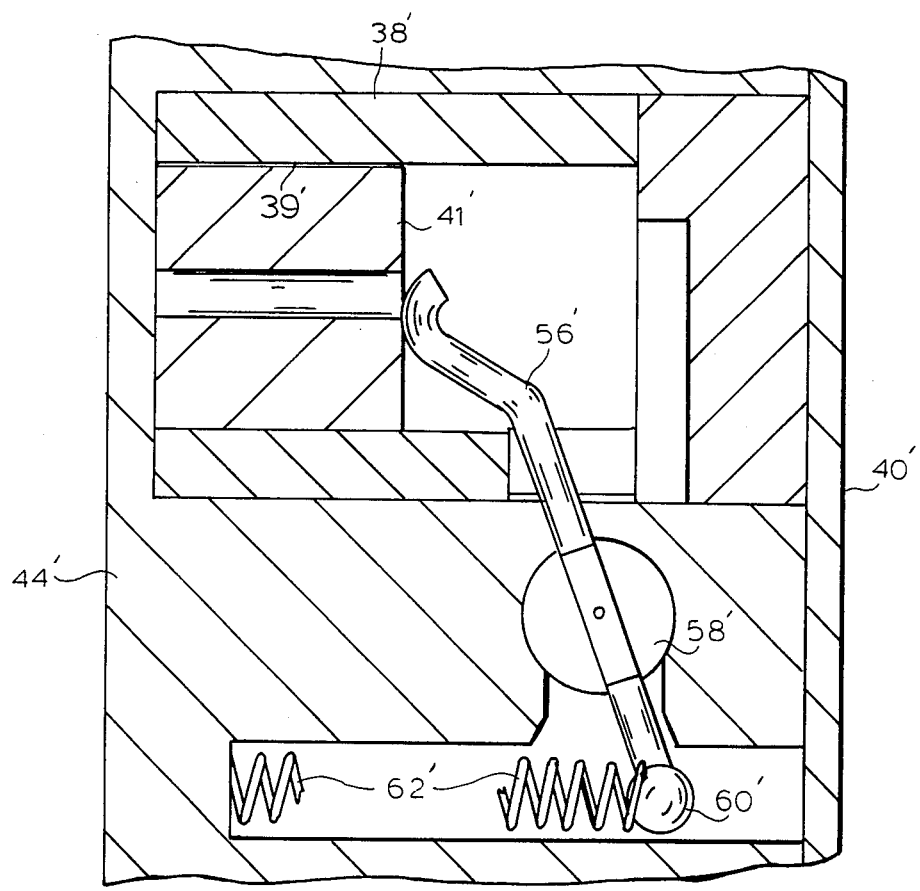
FIG. 10 is a view similar to FIG. 6 showing an alternate embodiment of this invention which is an undamped spring mass sensor.

In FIG. 10, an example of a pure spring mass sensor 38' is shown having an essentially undamped sensing mass 41'. In all other respects this sensor-initiator 10' is the same as sensor initiator 10 of FIGS. 4–9 and like numerals will be used with an accompanying prime for corresponding parts.

With respect to all sensors incorporating the teachings of this invention, and particularly the spring mass sensors whether damped or undamped, relatively low biases, preferably around 4 g and less than 7 g are contemplated, because of the location within the passenger compartment. In addition the sensors of this invention are velocity change detectors in the sense that they require a substantial velocity change to take place after the bias acceleration has been exceeded which requires that the acceleration be sustained above the bias for a substantial period of time. Normally this time will range from 15 to 100 milliseconds depending on the magnitude of the acceleration. In this manner, unnecessary air bag deployment will be minimized, and the air bag will be deployed when needed in cases involving long low acceleration crash pulses such as result from impacts with crash cushions.

When two sensor initiators are used for a passenger side system the sensitivity of the sensors could be different or alternately a pyrotechnic delay could be used with one of the sensor initiators to cause a staging of the air bag inflator. Such staging would be useful to reduce injury to out of position occupants.

Acceleration as used herein means acceleration of the vehicle in the reverse direction as would occur in a crash where the velocity of the vehicle is reduced or when a stationary vehicle is struck in the front causing it to accelerate backwards.

Primers as used herein includes any pyrotechnic device such as stab primers, stab detonators or electric squibs.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed is:

1. A sensor with a low-bias for mounting outside of the vehicle crush zone and operable without electrical power for actuating a pyrotechnic device, said sensor comprising:
   a movable sensing mass, a rotatable shaft, a sensing train which includes means for translating movement of the sensing mass rotation of the shaft, a primer, a spring biased firing pin operatively connected to the shaft for maintenance in a retracted position, relatively low g biasing means acting on the sensing mass, means requiring the sensing mass to move a predetermined distance before the shaft rotates sufficiently to permit the firing pin to be released to strike a primer.

2. The invention in accordance with claim 1 wherein lock means for provided for locking the sensing mass and rendering the sensor safe prior to mounting the sensor on the vehicle.

3. The invention in accordance with claim 1 wherein the sensor is provided with means for mounting the sensor in the passenger compartment of a vehicle.

4. The invention in accordance with claim 1 wherein the sensing mass is adapted for limited movement within a cavity in the sensor and the biasing means is a spring.

5. The invention in accordance with claim 4 wherein motion of the sensing mass is damped.

6. The invention in accordance with claim 1 wherein the interconnecting means includes a radially extending pin on the shaft which is adapted to engage the sensing mass.

7. The invention in accordance with claim 6 wherein the pin is provided with a diametrically opposed extension extending beyond the shaft and, the biasing means includes a biasing spring and means on the end in engagement with the spring for urging the pin against said sensing mass.

8. The invention in accordance with claim 1 wherein the shaft is a "D-shaft" including a face which provides clearance for the firing pin when the shaft is rotated a predetermined amount as a result of the movement of the sensing mass.

9. The invention in accordance with claim 1 wherein sensors are provided in duplicate with duplicate primers to provide redundant sensing systems for actuating an air bag inflator.

10. The invention in accordance with claim 1 wherein the bias of the biasing means is no more that 6 g.

11. The invention in accordance with claim 10 wherein the bias of the biasing means is about 4 g.

12. A non crush zone mechanical spring mass sensor for use with an inflatable air bag restraint system comprising:
   a sensing mass responsive to acceleration;
   a biasing means, such that the sensing mass moves against the urging of the biasing means at accelerations greater than a predetermined level that is less than 7 g's;
   a firing means responsive to a predetermined movement of said sensing mass;
   a primer adapted to be initiated by said firing means and which initiates inflation of said air bag.

13. A passenger compartment mounted sensor comprising means for providing a low bias level for the sensor, means for rendering the sensor responsive to velocity change, and means requiring the acceleration to be sustained above the bias level for an extended period of time.

14. A non crush zone mechanical spring mass sensor for use with an inflatable air bag restraint system comprising:
   a sensing mass responsive to acceleration;
   a biasing means, such that the sensing mass moves against the urging of the biasing means at accelerations greater than a predetermined level is less than 7 g's;
   a firing means responsive to a predetermined movement of said sensing mass;
   primer coupling means actuated by the firing means for igniting a primer which initiates inflation of said air bag.

15. The invention in accordance with claim 14, wherein the motion of the sensing mass is damped.

16. The invention in accordance with claim 12, wherein the motion of the sensing mass is damped.

* * * * *